Feb. 21, 1967   J. MERCIER ETAL   3,304,709
ELECTRO HYDRAULIC CONTROL SYSTEM
Filed June 11, 1964   4 Sheets-Sheet 4

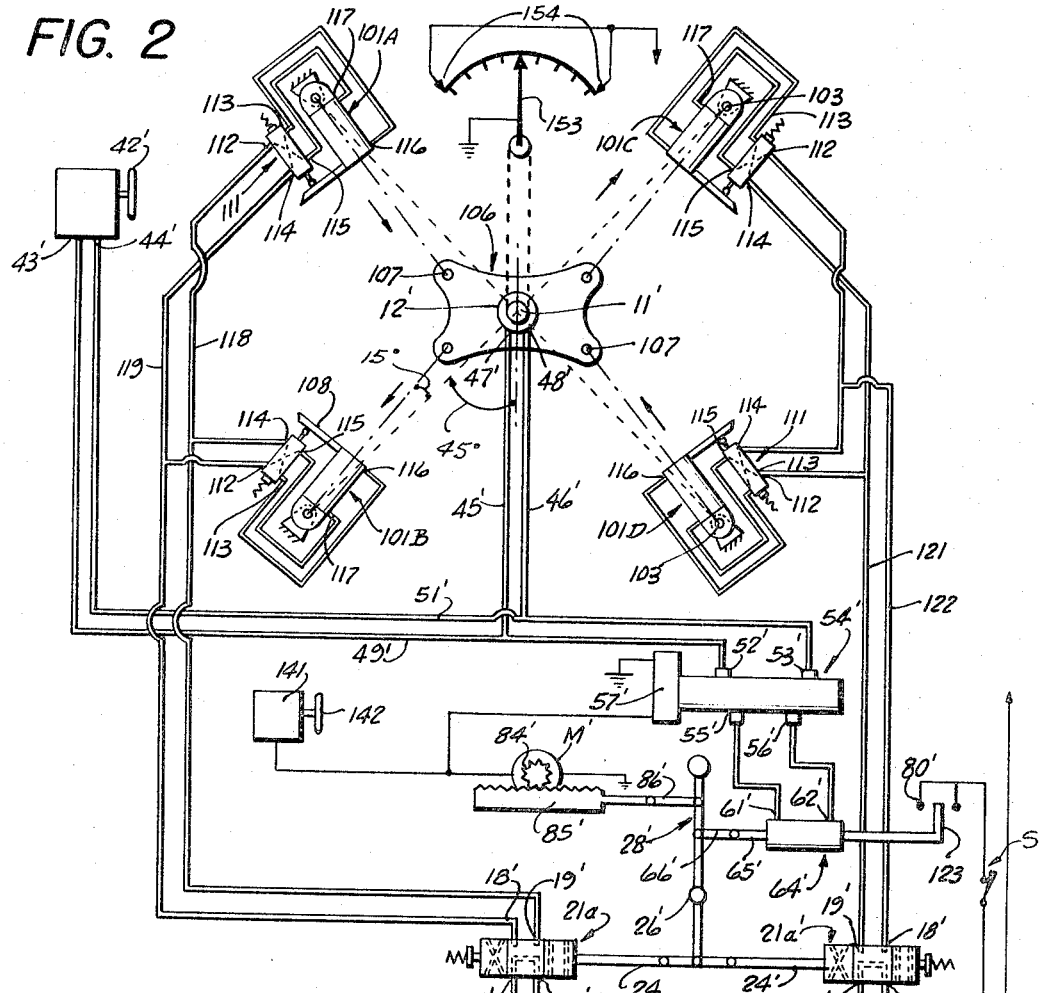

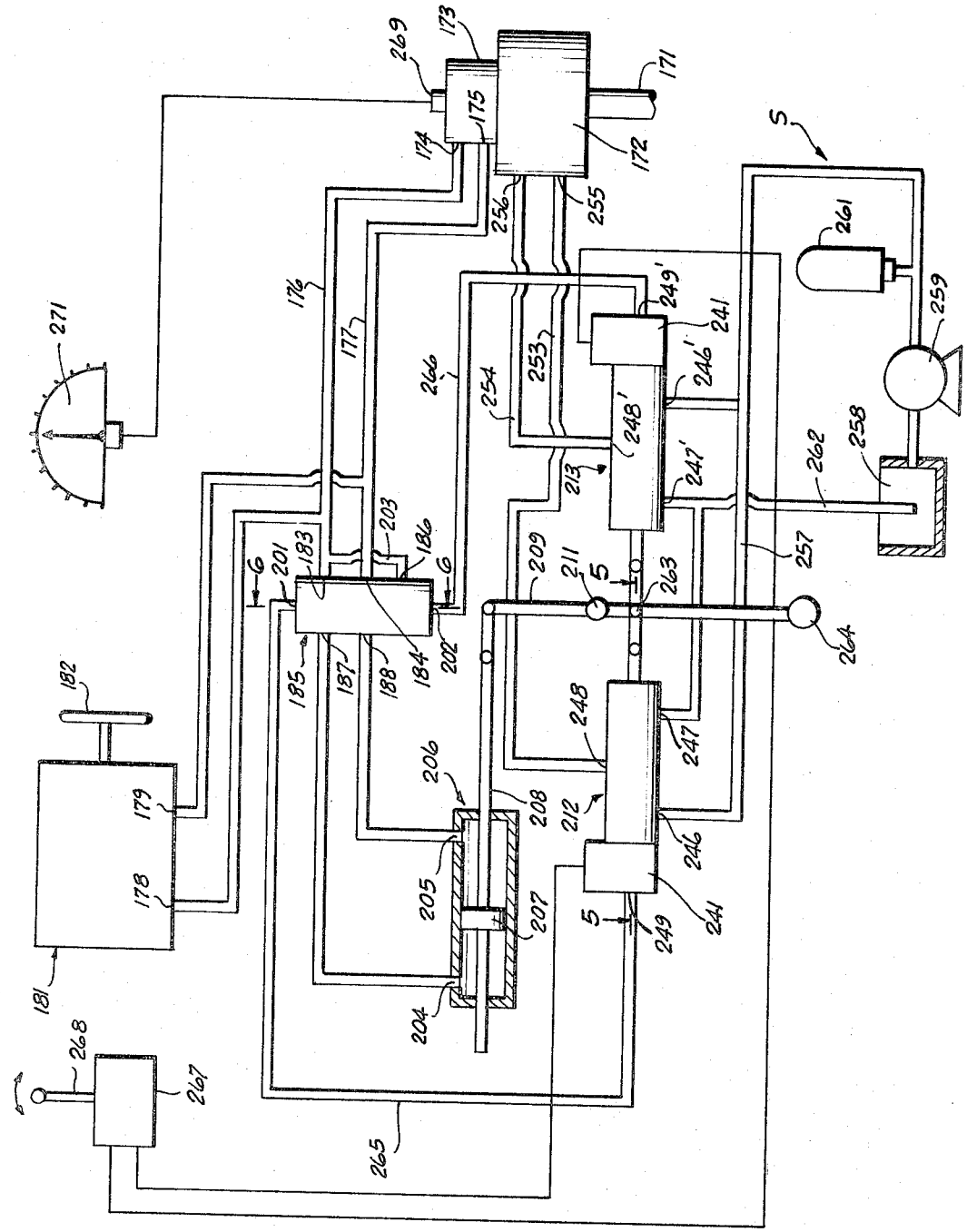

INVENTORS
JEAN MERCIER
BERNARD MERCIER
BY
Dean, Fairbank & Hirsch
ATTORNEYS

United States Patent Office 3,304,709
Patented Feb. 21, 1967

3,304,709
ELECTRO HYDRAULIC CONTROL SYSTEM
Jean Mercier and Bernard Mercier, both of New York,
N.Y.; said Bernard Mercier assignor to Jean Mercier,
Caldwell, N.J.
Filed June 11, 1964, Ser. No. 374,451
15 Claims. (Cl. 60—10.5)

This invention relates to the art of Hydraulic Control Systems, more particularly of the type to effect remote control of the rudder shaft of a ship.

As conducive to an understanding of the invention, it is noted that the rudder shaft of a ship, especially when the ship is large, requires considerable force for actuation thereof through an appreciable range of movement and with sufficient rapidity to take care of emergencies when the ship is traveling at high speed and the course of the ship must be rapidly changed.

Where such force is supplied by a high torque motor operatively connected to the rudder shaft and which is energized by a power source having a motor driven pump which feeds the motor, due to the kinetic energy of the heavy moving rudder, even when the power source is turned off the rudder continues its movement for an additional amount.

This additional movement, although not critical when the ship is on the high seas with ample room in which to maneuver can be extremely dangerous when the ship is in a confined area such as when it is in a harbor.

It is accordingly among the objects of the invention to provide a hydraulic control system which is relatively simple in construction and dependable in operation and which will provide a step by step movement of the rudder with substantially no overshoot from the desired setting of the rudder with controllable variations in the rate at which such step by step movement can be effected, and will also provide rapid movement of the rudder shaft over a controlled range when the ship is traveling at high speed and with a simple operation will permit rapid movement of the rudder shaft over full range when the ship is moving at low speeds such as when docking.

Another object is to provide a system of the above type which may be electrically operated to effect the desired steering action in case of failure of the manually operated telemotor normally used for steering action or where it is desired to use an automatic pilot for steering.

According to the invention, these objects are accomplished by the arrangement and combination of elements hereinafter described and more particularly recited in the claims.

Figure 1:
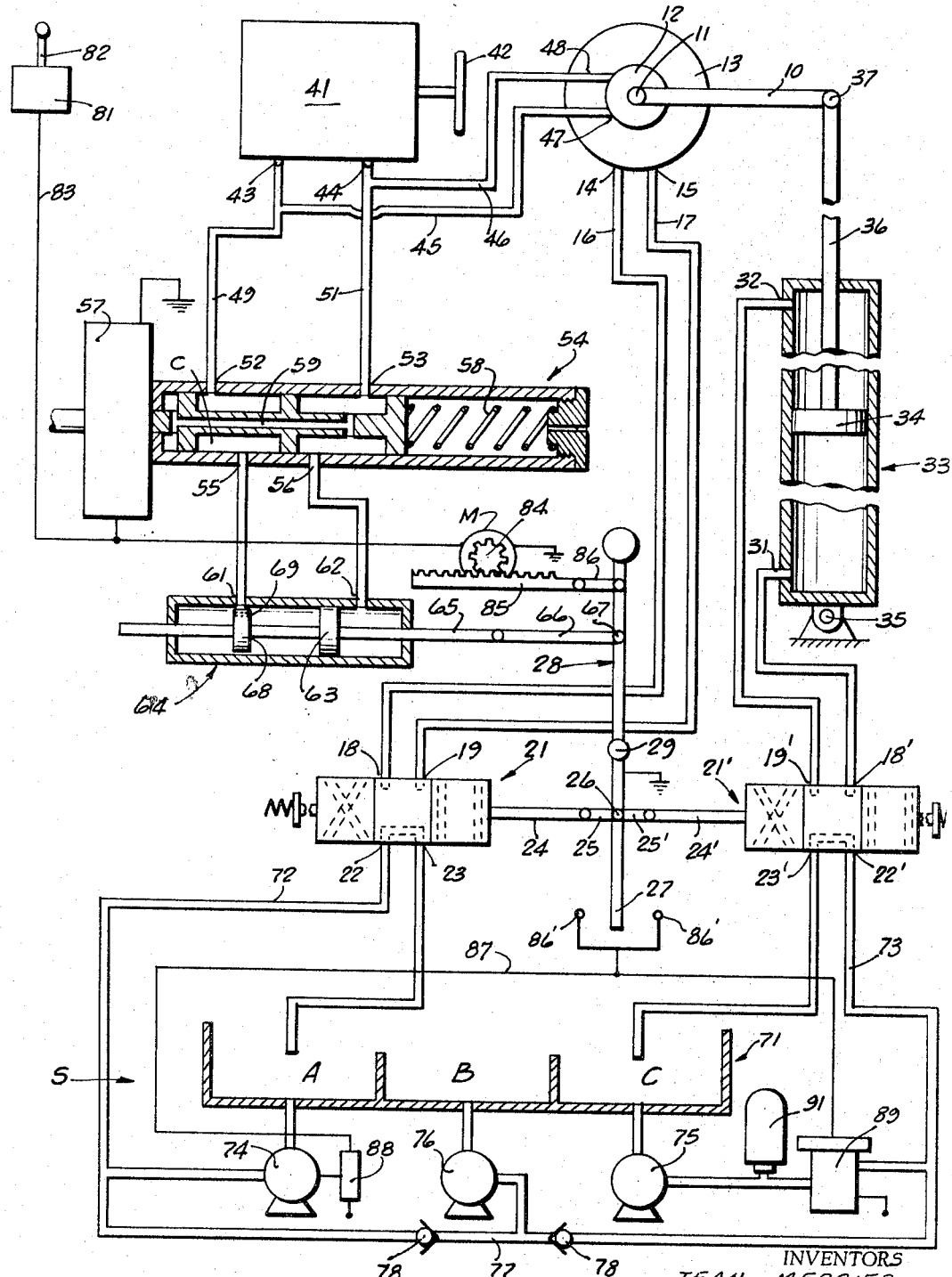
Figure 5:
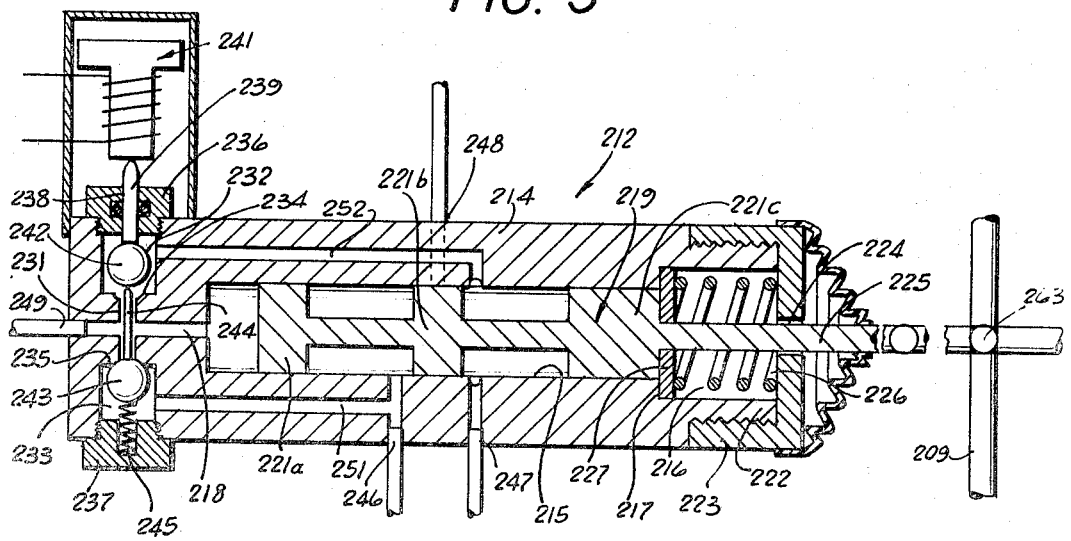
Figure 6:
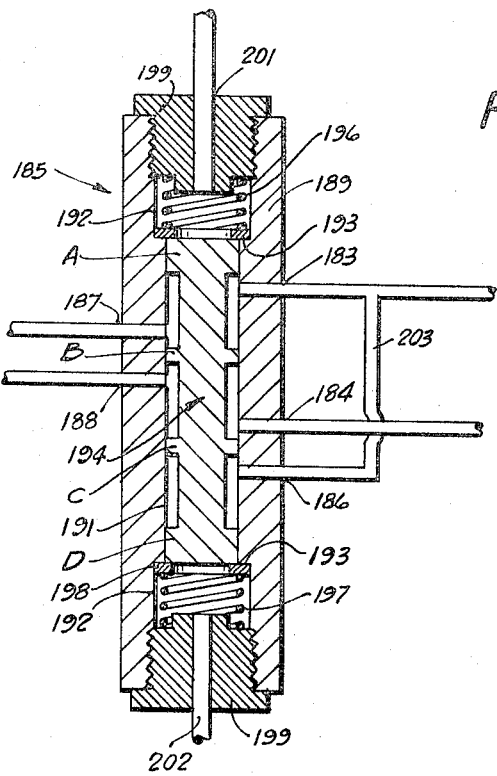

In the accompanying drawings in which are shown one or more of various possible embodiments of the several features of the invention, FIG. 1 is a diagrammatic view of one embodiment of the invention, FIG. 2 is a view similar to FIG. 1 of another embodiment of the invention similar to that shown in FIG. 1 in which one of the two hydraulic rotary motors driving the rudder shaft is replaced by a plurality of linear actuators, FIG. 3 is a detail view on an enlarged scale of one of the linear actuators utilized in the embodiment of FIG. 2, FIG. 4 is a diagrammatic view of still another embodiment of the invention, FIG. 5 is a longitudinal sectional view taken along line 5—5 of FIG. 4, but in the plane of the drawing, and FIG. 6 is a longitudinal sectional view taken along line 6—6 of FIG. 4, but in the plane of the drawing.

Referring now to the drawings, the embodiment shown in FIG. 1 is especially designed for large ships and the rudder shaft 11 has secured thereto a rudder bar 10 and hydraulic motors 12 and 13, the latter having a much greater torque output than the former.

The motor 13 has ports 14, 15 connected by lines 16, 17 to ports 18, 19 of a valve 21. The valve 21 is of conventional type being spring returned to open center neutral position and having two operating positions on each side of the neutral position respectively. The valve 21 has additional ports 22, 23 and a control member adapted in neutral position to close said ports 18, 19 and connect ports 22, 23 and in either extreme position to connect ports 19, 22 and 18, 23 or ports 18, 22 and 19, 23. A similar valve 21' is provided having ports 18', 19', 22', 23' adapted to be connected in similar manner as the ports of valve 21.

The control members of valves 21, 21' are connected respectively by rods 24, 24' to links 25, 25', which are pivotally connected at 26 adjacent the end 27 of a lever 28, the latter being pivotally mounted to a fixed support as at 29.

The ports 18', 19' are connected respectively to the ports 31, 32 of a hydraulic actuator 33 on each side of the piston 34 thereof. The end of the cylinder of actuator 33 is pivotally mounted to a fixed support as at 35 and the piston rod 36 thereof is pivotally connected to the end of rudder bar 10 as at 37.

In order to actuate the small motor 12, a fluid pressure source 41 is provided. This source comprises a telemotor which may be mounted on the bridge of a ship and has a steering wheel 42 for actuation thereof.

The telemotor has ports 43, 44 connected by lines 45, 46 to the ports 47, 48 of motor 12 and by lines 49, 51 to ports 52, 53 of a valve 54 which is solenoid actuated and spring returned. The valve 54 has two additional ports 55, 56 and a valve member controlled by solenoid 57. The valve 54 is normally retained by spring 58 in position to connect ports 52, 55 and ports 53, 56 and when solenoid 57 is actuated connects ports 52, 53 through passageway 59 and ports 55, 56 are connected through the annular chamber C.

The ports 55, 56 are connected to ports 61, 62 on each side of the piston 63 of an actuator 64, the piston rod 65 of which is pivotally connected through link 66 to lever 28 as at 67. The piston rod 65 also mounts a piston 68 which is of slightly smaller diameter than piston 63 to provide clearance between the periphery of piston 68 and the wall of the casing of actuator 64; in the illustrative embodiment shown a small diameter passageway 69 is provided through piston 68.

The ports 23, 23' of valves 21, 21' are connected respectively to sections A and C of reservoir 71 of power source S. The ports 22, 22' are connected by lines 72, 73 to the outlet of motor driven pumps 74, 75, the inlet of said pumps being connected to said reservoir sections A and C. In addition, a third constantly operating motor driven pump 76 is provided, having its inlet connected to section B of said reservoir and its outlet connected to line 77 which in turn is connected to lines 72, 73, one-way valves 78 in said line 77 preventing flow from pumps 74, 75 to pump 76.

In order electrically to control the system, an electric switch 81 is provided which illustratively is hand operated by control handle 82, but could be automatically operated by a conventional automatic pilot system.

The switch 81 is electrically connected by lead 83 to a motor M which drives a pinion 84 that engages a rack bar 85 which is pivotally connected through a link 86 to lever 28 and will effect movement of the lever in either a clockwise or counterclockwise direction depending upon the direction of movement of handle 82.

The lower end 27 of lever 28 which is connected to ground, is normally positioned midway between contacts 86' and adapted to engage either of these contacts when lever 28 is pivoted in the manner to be described.

The contacts 86' are connected by leads 87 to a relay 88 that controls the energization of the motor of pump 74 and to solenoid operated valve 89 which controls flow from pump 75 and pressure accumulator 91 connected thereto.

In the operation of the system shown in FIG. 1, when steering wheel 42 is rotated, fluid under pressure will flow for example from port 43 through line 45 to port 47 of motor 12 and from port 48 through line 46 to port 44 of the telemotor 41.

The motor 12 has only a fraction of the torque output of motor 13, i.e., 500 inch-pounds vs. 20 yard-tons for example and insufficient torque is available to rotate shaft 11.

Fluid under pressure will flow from port 43 of the telemotor through line 49 and through connected ports 52, 55 of valve 54 into port 61 of actuator 64.

As the piston 68 of actuator 64 is aligned with the port 61, only small clearance is provided for the flow of fluid into actuator 64. As a result, the initial movement of piston 63 to the right will be slow until piston 68 has been moved clear of port 61. As the piston 63 is connected through piston rod 65 and link 66 to lever 28, and the lever 28 is connected to rods 24, 24' of valves 21, 21' which are spring retained in neutral position, no movement will be imparted to piston 63 until the pressure in line 49 has built up sufficiently to overcome the force exerted by the spring of valves 21, 21'.

With continued rotation of steering wheel 42, since motor 12 still will not rotate, the pressure will build up sufficiently to move piston 63 to the right, fluid returning from port 62 through ports 56, 53 of valve 54 to port 44 of the telemotor 41.

Movement of piston 63 to the right will cause clockwise movement of lever 28 and movement of rods 24, 24' of valves 21, 21' to the left. This will cause ports 18, 23 and 19, 22 of valve 21 to be connected and the corresponding ports 18', 23' and 19', 22' of valve 21' to be connected.

If the movement imparted to lever 28 is only slight due to slow rotation of the steering wheel, no circuit will be completed to contacts 86' by the end 27 of lever 28. As a result, pump 74 and valve 89 will not be actuated. However, fluid under pressure will flow from pump 76 through lines 77, 72, 73 to ports 22, 22' of valves 21, 21' and through ports 19, 19', which ports are only partially opened, to port 15 of motor 13 and to port 32 of actuator 33. As a result, clockwise movement will be imparted to shaft 11 by motor 13, and bar 10.

As the rudder shaft 11 is rotated as above described, the motor 12 will also rotate and as a result, cavitation will occur in the pressure line 49 connected to port 47 of motor 12. This cavitation will cause a pressure drop in line 49 with resultant drop in the pressure on the fluid reacting against piston 63. Consequently, the springs of valves 21, 21' will cause the lever 28 to be moved back to neutral position blocking further flow of fluid under pressure to the motor 13 and actuator 33. With continued rotation of the steering wheel 42, the pressure again builds up and consequently there is a step by step movement of the rudder shaft 11.

Clearly, the incremental movement of the rudder can be very small with slow rotation of the steering wheel and can be large with rapid rotation of the steering wheel.

If faster movement is imparted to the steering wheel 42 which may be required in an emergency, where rapid movement of say plus or minus 35° is required of the rudder in say 10 seconds, for example, against the same movement required in 40 seconds under normal cruising operation, such greater movement will cause pivotal movement of lever 28 sufficiently so that the end 27 thereof engages contacts 86'. As a result, the relay 88 controlling motor pump unit 74 will be energized to energize such motor pump unit and in addition, the solenoid valve 89 will be energized to provide communication between pressure accumulator 91 and line 73, the motor pump unit 75 being de-energized automatically by a conventional pressure switch when the accumulator 91 is charged.

As a result of the high pressure, large volume flow from the accumulator through line 73 and connected ports 22', 19' which are now fully open due to the extreme movement of lever 28, a large volume of fluid under very high pressure will be forced into port 32 of actuator 33 to effect rapid downward movement of the piston 34 thereof, thereby quickly moving the bar 10 and rudder shaft 11 in a clockwise direction in the illustrative embodiment shown, thereby effecting rapid swing of the rudder. Such rapid movement imparted to the rudder shaft 11 by bar 10 would tend to cause the rotary motor 13 to cavitate which would cause build-up of air in the lines with resultant impact and shock when the system was restored to normal operation. This is avoided however, by reason of the supply of fluid under pressure from pump unit 74 which is applied through connected ports 22, 19 of valve 21 to port 15 of motor 13 in addition to the flow from pump unit 76 which is totally diverted into port 22 by reason of the fact that the high pressure from accumulator 91 retains the associated one-way valve 78 in closed position.

Such combined pressure from pump units 74, 76 in addition to preventing cavitation in the system also supplies additional power to enhance the speed of rotation of the shaft 11 which has force applied thereto both from actuator 33 and motor 13.

It is to be noted that with the rudder in normal position, i.e., extending longitudinally of the longitudinal axis of the ship, the angle between the bar 10 and piston rod 36 illustratively is 90°.

Thus, as the piston rod 36 moves downwardly for example, the actuator 33 will pivot in a counterclockwise direction about its pivot 35 and the pivotal connection 37 of the piston rod 36 and bar 10 will move toward alignment with the axis of shaft 11 and pivot 35. As the pivot 37 moves closer to such alignment, the lever arm becomes smaller and smaller with the result that the torque imparted by actuator 33 to shaft 11 will progressively be reduced. Thus, for example, assuming that the pivots 35 and 37 become longitudinally aligned with shaft 11 with 80° rotation of the rudder shaft, the torque will progressively decrease from maximum to zero. This is important to prevent rapid swing of the rudder shaft through an 80° angle when the ship is proceeding at relatively high speeds; with the rudder at such position it would be damaged or broken. Due to the automatic reduction in torque by the geometry of location of the actuator 33, the helmsman cannot inadvertently, by rapid turning of the steering wheel 42, cause the rudder to move quickly, past, say ±50° for the reduction in torque is such that the resistance of the rudder due to movement of the water against the rudder at high speed, will prevent such rotation.

Even though the pump units 74, 76 are still supplying fluid under pressure to motor 13, this along will not cause rapid movement of the rudder since the pressure available from such units is only 25% for example of that available from the accumulator 91.

If, however, the speed of the ship is slow enough when it is being steered, there will be little resistance against the rudder and consequently even if torque applied to actuator 33 past, say, plus or minus 50°, due to the reduced lever arm is low, the pressure available from pumps 74, 76 will be sufficient so that enough torque will be developed by motor 13 to rotate the rudder shaft through an angle of 80° which may be required for docking purposes.

The follow up movement effected by the small motor 12 will also take place in the same manner as previously described. However, in view of the rapid movement of the steering wheel, the incremental steps will be very large.

In the event the telemotor 41 should be disabled or where it is desired to switch an automatic gyro-pilot into circuit, the electrical control system shown in FIG. 1 may be employed. Thus, the helmsman can move the control handle 82 of switch 81 to the left or right as desired.

Assuming that it is moved in direction to cause motor M to rotate in a counterclockwise direction, it will cause the rack bar 85 to move to the right and also will energize solenoid 57. The energization of solenoid 57 will cause ports 52 and 53 to be connected to short circuit the telemotor and motor 12, and will cause ports 55, 56 to be connected to short circuit actuator 64.

As a result of the movement of the rack bar 85 to the right, the lever 28 will be pivoted in a clockwise direction to effect the actuation of valve 21, 21' as previously described.

The embodiment shown in FIGS. 2 and 3 which is also designed for the rudder shafts of large ships, is similar to the embodiment of FIG. 1 and corresponding parts have the same reference numerals primed. The shaft 11' of the rudder has secured thereto a very small torque hydraulic motor 12' having a torque output in the order of say a few hundred foot-pounds.

In order to apply a great torque to the shaft 11' in the order of say 500 foot-tons, for example, a plurality of hydraulic actuators 101A, B, C, D are provided. These actuators are operatively connected to the shaft 11' so that when energized each will apply rotary force to the shaft in the same direction, thereby giving the total effect of the force exerted by the four actuators.

In the illustrative embodiment herein shown, the actuators 101 are identical and hence only one will be described in detail.

Each of the actuators comprises a cylinder 102 pivotally mounted at one end as at 103 on a fixed support. Each actuator has a piston 104 slidably mounted therein to which is secured one end of a piston rod 105. In order to operatively connect the piston rods 105 to the shaft 11', an actuating plate 106 is secured to the shaft 11'. As shown, the plate is substantially rectangular in configuration, of greater length than width with the ends of each actuator being connected to the corners of the plate as at 107.

The hydraulic actuators 101 are so positioned with respect to the rudder shaft 11' that in the neutral position of the rudder when it is longitudinally aligned with the longitudinal axis of the ship, lines drawn from the longitudinal axis of the shaft 11' to the pivotal axis 103 of each of the actuators 101 will define angles of 90° therebetween.

In the illustrative embodiment shown, a line drawn from each of the pivot corners 107 of the pivot plate 106 to the pivotal axis 103 of each actuator 101 will define an angle of say 15° with respect to the line drawn from such pivotal axis 103 to the shaft 11'.

With this arrangement, it is apparent that if, for example, the pistons 104 of actuators 101A and 101D moved outwardly, and the pistons of actuators 101B and 101C are moved inwardly simultaneously, the sum of the forces provided by such four actuators will provide torque to rotate the shaft 11' in a counterclockwise direction.

Each of the actuators carries a cam bar 108 which is designed to cooperate with the projecting end 109 of the valve member of a conventional distributor valve 111 secured in fixed position with respect to the pivotally mounted actuator 101. The valve 111 is designed in one position when the end 109 is restrained by bar 108 to connect its ports 112, 115 and 114, 113 and in another position when the cam bar 108 has moved away from the end 109 to connect ports 112, 113 and 114, 115.

The ports 113, 115 of the valves are connected to ports 116, 117 of the actuator on each side of the piston 104 thereof.

The ports 114, 112 of actuators 101A and B respectively are connected to line 119. The ports 112, 114 of actuators 101A and B respectively are connected to line 118. The ports 112, 114 of actuators 101C, D respectively are connected to line 122. The ports 114, 112 of actuators 101C and D respectively are connected to line 121.

The ports 47' and 48' of motor 12' are connected by lines 45' and 46' to the ports 52' and 53' of a solenoid operated disconnector valve 54' identical to the valve 54 shown in FIG. 1. In addition, the lines 45' and 46' are connected by lines 49' and 51' to the ports 43' and 44' of a telemotor 41' which is controlled by steering wheel 42'.

The ports 55' and 56' of valve 54' are connected to ports 61' and 62' of a hydraulic actuator 64' which is identical to the actuator 64 shown in FIG. 1. The control rod 65' of actuator 64' is pivotally connected through a link 66' to lever 28' pivotally mounted as at 26' to a fixed support. Also pivotally connected to the lever 28' through a link 86' is a rack 85' similar to the rack 85 shown in FIG. 1 and driven by a pinion 84' on an electric motor M'. The end of rod 65' protruding from the actuator 64' carries a contact finger 123 adapted to engage either of fixed contact 80' upon sufficient movement of said rod, the electrical circuit completed by engagement of the contact finger with the contacts being hereinafter described.

The lever 28' is connected to valves 21a and 21a' identical to the valves 21, 21' shown in FIG. 1. The ports 18' and 19' of valve 21a are connected to lines 119 and 118 respectively and the ports 18' and 19' of valve 21a' connected to lines 122, 121 respectively. The ports 23', 23' of the valves 21a and 21a' are connected respectively to chambers A' and C' of a reservoir 71', which forms part of the power source S', said chambers being defined by vertical partitions 124 in said reservoir of height less than the height of the reservoir. The ports 22' and 22' of the valve 21a, 21a' are connected by lines 72' and 73' to junctions 125, each junction being connected to one side of an unloader valve 126, the other side of which is connected by line 127 to chambers A' and C' of the reservoir. The junctions 125 are also connected to lines 128 and through one-way valves 129 to the outlet of a motor driven pump 131, 132 and to the inlet of the unloader valve. In addition, the lines 128 are connected through one-way valves 133 to outlet port 135 of a solenoid control valve 136, the inlet 137 of said valve being connected to the port of a high pressure accumulator 138 and to a motor driven pump 139 of much higher pressure than the pumps 131 and 132. The inlet of pumps 131 and 132 are connected to chambers A' and C' and the inlet of pump 139 is connected to chamber B' between the partitions 124.

Means are provided electrically to control the movement of the rudder shaft for actuation thereof. To this end, as shown in FIG. 2, an electric actuator 141 is provided on the bridge of a ship, for example, which is controlled by a wheel 142. The actuator is electrically connected to the solenoid 57' of valve 54' and to electric motor M' which is of the reversible type. Thus, regardless of the direction of movement of the wheel 142, of actuator 141, the solenoid valve 54' will be energized to effect movement of the valve member thereof to the right against the force exerted by the spring thereof to short circuit the lines from the motor 12' and telemotor 41' so that such units are effectively out of circuit and depending upon the direction of movement of the wheel of electric actuator 141, the rack 85' will be moved either to the left or right to pivot the lever 28' in the corresponding direction.

Normally, with slight movement of the wheel 42' the high pressure source provided by accumulator 138 and pump 139 is not in circuit. When relatively large movement of the rudder is desired, the contact arm 123 will engage either fixed contact 80' to complete a circuit to solenoid valve 136 so that high pressure will be supplied through such valve from the accumulator 138.

In order to prevent application of such high pressure when the rudder has moved through an angle of say greater than 40°, a relay 151 is provided having switch contacts 151' in lead 152 connected between contacts 80' and valve 136 which will be open through engagement of movable contact arm 153 and fixed contacts 154 at such desired angle of position of the rudder.

In the operation of the system shown in FIGS. 2 and 3, when steering wheel 42' is rotated, fluid under pressure will flow, for example, from port 43' through line 49' to port 47' of motor 12' and from port 48' of the motor through line 51' to port 44' of the telemotor. As the motor 12' has only a fraction of the torque output provided by the four actuators 101, i.e, 500 inch-pounds as compared to 20 yard-tons, for example, insufficient torque is available to rotate shaft 11'.

Fluid under pressure will also flow from port 43' of the telemotor through line 49' to port 52' of valve 54' and as the valve is in the position shown in FIG. 1, such fluid will flow through port 55' of the valve 54' to port 61' of actuator 64', causing the piston 63 thereof to move to the right. Due to the fact that the port 61' of actuator 54' is restricted by the piston 68 associated therewith, fluid will flow relatively slowly at the outset. As the piston 63 of actuator 64' is connected through link 66' to lever 28', the latter will be pivoted in a clockwise direction from the position shown in FIG. 2 to effect movement to the left of the rods 24, 24' of valves 21a and 21a' which are spring retained in neutral position as shown in FIG. 1.

Due to the force exerted by the springs associated with valves 21a and 21a', no movement will be imparted to the lever 28' until the pressure in line 49' from the telemotor has built up sufficiently to overcome the force exerted by the springs of valves 21a and 21a'.

With continuous rotation of steering wheel 42' since the motor 12' will still not rotate, the pressure in line 49' will build up sufficiently to move piston 63 of actuator 64' to the right as above set forth.

Movement of piston 63 to the right will cause clockwise movement of lever 28' which will cause the ports 19', 22' and 18', 23' of valve 21a to be connected and the corresponding ports 19', 22' and 18', 23' of valve 21a' to be connected.

If the movement imparted to lever 28' is only slight due to slight rotation of the steering wheel, no circuit will be completed to contacts 80' by the contact 123 of hydraulic actuator 64'. As a result, solenoid valve 136 of the power source S' will not be actuated and at this time the accumulator 138 and pump 139 will not be in circuit.

However, fluid under pressure will flow from pumps 131 and 132 through one-way valves 129, lines 128, 72', 73' to the ports 22' and 22' of valves 21a and 21a' and due to the connection of the ports of the valves as above described, the fluid under pressure in line 118 will flow into ports 112, 114 of the valves 111 of actuators 101A and B respectively and from line 121 to ports 114, 112 of the valves 111 of actuators 101C and D.

As the valves, when the rudder is longitudinally aligned with the longitudinal axis of the ship will have their ports 112, 115 and 114, 113 respectively in communication, the fluid under pressure will react against the pistons of the respective actuators 101A, B, C and D so that the pistons of the respective actuators 101A and D will be moved outwardly and the pistons of actuators 101B and C will be moved inwardly.

As a result, the four actuators will transmit torque in the same direction with respect to the rudder shaft 11' to effect rotation of said rudder shaft with the torque available resulting from the action of pumps 131 and 132.

It is to be noted that when the rudder shaft rotates say 15° in a counterclockwise direction, the pivotal axes 103 of the actuators 101B and C and the pivots 107 of the plate 106 will be aligned with the axis of shaft 11' and hence at this instance no torque will be imparted to the shaft by the actuators 101B and C and only the actuators A and D would be applying torque. However, due to the rotation of shaft 11', the cam bars 108 of actuators B and C would move away from the ends 109 of the actuators of the associated valves 111 so that said valves would automatically switch, connecting their ports 112, 113 and 114, 115. As a result, the fluid under pressure would now be applied in a direction to move the pistons of actuators B and C outwardly so that at this time all four actuators would have their pistons moved outwardly to apply the total torque from such actuators to the rudder shaft 11'.

It is apparent therefore that at all times all four actuators 101 are utilized to apply torque to the shaft 11' except at the fraction of a second during which the valves of actuators B and C are switching which have no effect on the steering action.

Due to the geometry of the system, it is apparent that the rudder shaft can move through an angle of at least plus or minus 90° for precision maneuverability of the ship such as is required when docking.

As the rudder shaft is rotated, as above described, the motor 12' will also rotate and as a result cavitation will occur in the pressure line 49' connected to the port 47' of the motor. This cavitation will cause a pressure drop in line 49' with resultant drop in the pressure on the fluid reacting on piston 63 of actuator 64'. Consequently, the springs of valves 21a and 21a' will cause the rods 24, 24' to react against the lever 28' which will be restored to neutral position blocking further flow of fluid under pressure to the actuators 101. With continued rotation of the steering wheel, the pressure again builds up and consequently there is a step by step movement of the rudder shaft.

Clearly, the incremental movement of the rudder can be very small with slow rotation of the steering wheel and can be large with rapid rotation of the steering wheel.

If faster movement is imparted to the steering wheel which may be required in an emergency where rapid movement of the rudder is required, where, for example, the ship is moving at high speed with the water offering great resistance to the rudder, it is necessary in order to effect such rapid movement of the rudder that much greater torque be available than is required during routine steering action.

Such torque is automatically applied by the system herein described.

Thus, with rapid movement of the steering wheel, the pressure in line 49' applied to port 61' of the actuator 64' will rapidly build up to effect rapid and total movement of the piston 63 so that the contact member 123 will engage contact 80' completing a circuit to the solenoid valve 136 of the power source.

As a result, fluid under high pressure stored in the accumulator 138 will flow to line 128, through one-way valves 133, to the ports 22' and 22' of valves 21a and 21a'. Since the pressure from accumulator 138 is much greater, i.e., four times that from either of the pumps 131 and 132, it is apparent that the check valves 129 will prevent flow to such pumps which might otherwise be injured. Such sudden application of high pressure from the accumulator will be applied through valves 21a and 21a' to the four actuators 101 to effect extremely rapid movement of the pistons thereof due to the greater pressure applied thereto so that the rudder will quickly respond to the steering action. It is apparent that the followup system effected by the small motor 12' will also take place in the same manner as previously described. However, in view of the rapid movement of the steering wheel and hence of the pistons, the incremental steps will be very large.

It is of course to be noted that when the one-way valves 129 are closed, as above described, it is necessary that the pumps 131 and 132 which are continuously operating, be discharged to the reservoir and this is accomplished by the conventional unloader valves 126.

It is to be noted that although such high torque provided by the accumulator is desired in an emergency for rapid movement of the rudder, it is also essential that the rudder not be moved with high torque when it has passed an angle of say plus or minus 40° when the ship is moving at high speed which might break the rudder.

This is accomplished in the embodiment of FIG. 2 by the contact arm 153 which engages fixed contact 154 when the rudder shaft has moved through an angle of plus or minus 40°, for example.

When this occurs, an electric circuit is completed to the coil of relay 151 to open the contacts 151' in the circuit to the solenoid valve 136 of the high pressure source.

As a result, the solenoid valve 136 will close to cut off application of fluid under high pressure from the accumulator 138 and hence only the pumps 131 and 132 which apply fluid under relatively low pressure as compared to that from accumulator 138 will be available to effect movement of the pistons of actuators 101.

It is to be noted that when the ship is being docked and is moved at very slow speeds, it is desirable that the rudder be capable of moving through angles in excess of plus or minus 40° and for this purpose a switch S is provided in the circuit to relay 151 which is open when the ship is being docked so that the relay 151 will be out of circuit.

In cases where the hydraulic telemotor 41' is not operative, or it is desired to effect steering action either manually by an electric control or automatically by an automatic pilot such as a Sperry automatic pilot, the electrical system shown in FIG. 2 is provided. This system may comprise the electric actuator 141 controlled by wheel 142. The actuator 141 is connected to reversible motor M' which will turn in one direction or the other depending upon the direction of rotation of the wheel of the electric actuator. As the operation of the motor M' has been previously described with respect to the embodiment of FIG. 1, it will not be described.

In the embodiment shown in FIG. 4, which is especially designed for medium sized ships requiring a torque to move the rudder of less than 30 foot-tons with an emergency hand operation from the deck of the ship of less than three foot-tons for movement of the rudder, the rudder shaft 171 has secured thereto hydraulic motors 172 and 173 of the type previously described, the motor 172 being capable of developing such torque of 30 foot-tons and the motor 173 only being capable of a much lesser torque, i.e., in the order of 3 foot-tons.

The motor 173 has ports 174, 175 connected by lines 176, 177 to the ports 178, 179 of a telemotor 181 mounted on a bridge of the ship and which has an associated manually operable steering wheel 182.

The lines 176, 177 are also connected to the ports 183, 184 of a disconnecting valve 185 (FIG. 5). The valve 185 has additional ports 186, 187 and 188 and as shown in FIG. 5, illustratively comprises a cylindrical casing 189 having a bore 191 therethrough of enlarged diameter as at 192 at its outer ends defining annular shoulders 193. Positioned in said bore is a slidably mounted valve member 194 having four piston conformations 194A, 194B, 194C and 194D between its ends, the length of the valve member 194 being such that when in neutral position it will extend between the annular shoulders 193. The valve member is normally retained in such neutral position by means of coil springs 196, 197 compressed between washers 198, seated on the shoulders 193, and the inner end of plugs 199, illustratively threaded in the open ends of the casing, each of the plugs having a port 201, 202. As illustratively shown, the port 186 is connected by line 203 to port 183 and in the neutral position of the valve member 194, ports 183, 187 are connected and ports 184, 188 are connected. The springs 196, 197 are prestressed to exert a force that will require a pressure of say ten atmospheres to effect movement of the valve member 194 against the tension of the associated spring.

The ports 187, 188 are connected to the ports 204, 205 of an actuator 206 which, as shown in FIG. 4, comprises a cylindrical casing having a piston 207 slidably mounted therein, said piston having a piston rod 208 associated therewith and extending through both ends of the actuator casing. One end of the piston rod 208 is pivotally connected through a suitable link to an end of a lever 209 pivotally mounted to a fixed support as at 211. Associated with the lever are two conventional pilot operated three-way solenoid valves 212, 213, more clearly shown in FIG. 5.

As such valves are identical, only valve 212 will be described in detail.

Referring to FIG. 5, the valve 212 comprises a cylindrical casing 214 having an axial bore 215 of enlarged diameter as at one end as at 216 defining an annular shoulder 217 and of reduced diameter as at 218 at its other end.

Slidably mounted in the bore 215, is a valve member 219 which has three piston portions 221a, 221b and 221c. The end 222 of casing 214 has an associated closure cap 223 secured as by threading on said end 222, said closure cap having an axial opening 224 through which extends the axial stem 225 of valve member 219. The valve member 219 is normally resiliently urged to the left as shown in FIG. 5 with respect to valve 212 and to the right with respect to valve 213 by a coil spring 226 positioned in the enlarged diameter portion 216 of bore 215 and compressed between the cap 223 and a washer 227, the movement of which is limited by its abutment against shoulder 217 and also against the adjacent end of piston 221c.

The casing 214 of valve 212 has a transverse bore 231 intersecting the axial bore 218. The transverse bore 231 is of enlarged diameter at both ends as at 232, 233 defining annular valve seats 234, 235 respectively. The outer ends of the enlarged diameter portions 232, 233 are closed by threaded plugs 236 and 237, the plug 236 having an axial bore 238 slidably to mount the plunger 239 of an electric solenoid 241, which plunger extends into the portion 232. Positioned in each of the enlarged portions 232, 233 is a valve, illustratively a ball 242, 243, the ball 243 having a stem 244 of smaller diameter than bore 231 and extending therethrough, the length of the stem 244 being such that when ball 243 is against its seat 235, the free end of stem 244 will abut against ball 242 to retain the latter spaced from its seat 234.

The ball 243 is normally retained against its seat 235 by means of a coil spring 245 positioned in plug 237 and reacting against said ball 243.

The valve 212 has ports 246, 247 and 248 and the valve 213 has corresponding ports 246', 247' and 248'. In addition, the axial bore 218 of each valve 212, 213 has an associated port 249, 249'.

The port 246 leads into the bore 215 between pistons 221a and 221b, when the valve member is in neutral position and the port 246 is in communication through a passageway 251 with the enlarged portion 233 of valve 212. The port 248 is blocked by piston 221b, when the valve member is in such neutral position and the annular space between pistons 221b and 221c is in communication through passageway 252 with the enlarged portion 232.

The ports 248, 248' of valves 212, 213 are connected by lines 253, 254 to ports 255, 256 of motor 172. The ports 246, 246' of said valves 212, 213 are connected by common line 257 to the outlet of pressure source S. This pressure source which may be of conventional type includes a reservoir 258 to which a motor driven pump 259 is connected, the outlet of said pump being connected to the fluid port of a conventional pressure accumulator 261 and also to line 257.

The ports 247, 247' are connected by common line 262 to the reservoir 258.

The stems 225 of valves 212, 213 are pivotally connected through suitable links to the lever 209 as at 263, said lever having an operating handle 264 at its free end for manual operation thereof.

The ports 249, 249' of valves 212, 213 are connected by associated lines 265, 266 to the ports 201 and 202 of disconnecting valve 185.

For electrical operation of the system, which is required either when the manually operated telemotor is disabled or for quick steering action, a switch 267 is provided having an operating handle 268, said switch being connected to the solenoids 241 of valves 212, 213 so that depending upon the direction of movement of handle 268, the respective valves 212, 213 will be actuated. The position of the rudder shaft 171 may be electrically indicated by a suitable servo position indicator 269, electrically connected to a suitable indicator 271 on the bridge of the ship.

In the operation of the system shown in FIGS. 4 to 6 inclusive, when the steering wheel 182 is rotated, fluid under pressure will flow for example from port 179 through line 177 to port 175 of motor 173 and also to port 184 of disconnecting valve 185. In addition, a return path will be provided from port 174 of motor 173 through line 176 to port 178 of the telemotor 181.

Due to the fact that ports 184 and 188 of valve 185 are connected, fluid under pressure will be applied to port 205 of actuator 206 to react against the piston 207 thereof, to urge the latter to the left thereby attempting to move the lever 209 in a counterclockwise direction. Such movement of the lever will cause force to be exerted against the stems 225 of valves 212, 213 to move them to the right. However, since the movement of stem 225 of valve 212 is restrained by coil spring 226, which requires a force related to a pressure of greater than 15 atmospheres for movement of valve member 219, initial rotation of steering wheel 182 will not effect movement of the lever and the valve members until the pressure in line 177 has built up to greater than 15 atmospheres.

At this time it is to be noted that there is insufficient pressure in line 177 to effect rotation of motor 173.

With continued rotation of the steering wheel 182 since motor 173 still will not rotate, the pressure in line 177 will build up sufficiently so that the force exerted against piston 207 of actuator 206 will overcome the force exerted by spring 226 of valve 212 so that the lever 209 will pivot in a counterclockwise direction effecting movement of the valve member 219 of valves 212, 213 to the right from the position shown in FIGS. 4 and 5.

With such movement of the valve members 219 of valves 212, 213 to the right, the ports 246 and 248 of valve 212 will be connected and the ports 247' and 248' of valve 213 will be connected. As a result, the pressure source S will be connected through line 257 and ports 246, 248 of valve 212 to port 255 of motor 172 and the port 256 of said motor 172 will be connected through line 254, ports 248', 247', line 262 to reservoir 258.

As a result, fluid under pressure will flow into the large motor 172 to effect rotation of the rudder shaft 171. As such rudder shaft rotates, the motor 173 will also rotate thereby causing a pressure drop in line 177. As a result of such pressure drop, the pressure exerted against piston 207 will drop and the compressed spring 226 of valve 212 will cause the valve member 219 which is no longer restrained by the lever 209 to move back to neutral position disconnecting further flow of fluid under pressure to the motor 172 so that the latter will stop rotating.

As previously described, with continued rotation of the steering wheel the pressure in line 177 will again build up and the operation above described will repeat in step by step increments causing step by step rotation of the rudder shaft 171. Since the repetition rate of such step by step movement of the rudder shaft is a function of the speed of rotation of the steering wheel, it is apparent that relatively rapid movement of the rudder can be effected by rapid movement of the steering wheel and slow incremental movement of the rudder can be effected with slow rotation of the steering wheel.

It is clear that the amount of movement of the rudder in each step is also a function of the rate of rotation of the steering wheel. Thus, if the steering wheel is moved very slowly, as soon as the pressure builds up sufficiently to start movement of the valve member to crack the port 248, there will be flow of fluid under pressure to the motor 172 to effect rotation of said motor and also of motor 173 which will immediately cause the pressure to drop so that the valve member will be restored to neutral position.

As a result, the incremental movement of the rudder will be very small. If, however, the steering wheel is turned quickly even a small angular amount, the pressure build up will be very high which will cause large cracking of the port 248 so that greater flow from the source S will be provided to the motor 172 for a larger incremental step.

Thus, the system above described is extremely useful both for maneuvering in open seas where precision movement of the rudder is not required and also in restricted regions where precision movement is required.

The steering wheel 182 is so geared to the conventional volumetric pump (not shown) contained in the standard telemotor 181 that illustratively a 360° rotation of the steering wheel is required for say five degrees rotation of the rudder, which means that under any conditions, even with rapid rotation of the steering wheel 182, only gradual movement of the rudder can be effected.

Under emergency operations it is often essential to have rapid movement of the rudder and for this purpose the electrical system shown in FIG. 4 is provided.

Thus, where the helmsman for example, in an emergency such as exists when two ships are on an immediate collision course, wishes rapid movement of the rudder, he can merely move the handle 268 of switch 267 in the desired direction. Assuming, for example, he desires to control the valve 212, by appropriate movement of the handle 268, the solenoid 241 of valve 212 will be energized.

As a result, the plunger 239 will be moved downwardly forcing the ball 242 downwardly against its seat 234 and hence through stem 244 moving the ball 243 off its seat 235 against the tension of spring 245. With ball 243 moved off its seat, a path for fluid under pressure will be provided from pressure source S through line 257 to port 246 thence through passageway 251 into enlarged portion 233 of valve 212 and through transverse bore 231 into axial bore 218 and into bore 215 to react against the adjacent end of piston 221a, moving the valve member 219 to the right. At the same time the fluid will flow from bore 218 and port 249 through line 265 into port 201 of disconnecting valve 185.

In order to prevent the rotation of the motor 172 and the motor 173 driven thereby, from causing movement of the actuator 206 which would be in the opposite direction to the desired movement of the valves 212, 213, it is necessary to insure that rotation of motor 173 has no effect on the actuator 206 and in addition, it is necessary that the piston of the actuator 206 and the motor 173 be free to move or rotate as the case may be without any effect on the rest of the system. This is accomplished automatically by having the springs 196, 197 of the disconnector valve 185 exerting less force than the springs 226 of the valves 212, 213. Consequently, when fluid under pressure is applied to bore 215 of valve 212 and to port 201 of disconnecting valve 185, since the valve member 194 of valve 185 will move at a pressure say 10 atmospheres, whereas the valve member 219 of valve 212 requires say 15 atmospheres, it is apparent that the valve member 194 will first move downwardly before movement is imparted to the valve member of valve 212.

As a result of such movement of valve member 194 of valve 195, the ports 187, 188 will be connected and the ports 184 and 186 will be connected, thereby short circuiting the ports 204, 205 of actuator 206 and the ports 174, 175 of motor 173 and the telemotor so that effectively said actuator and said motor and telemotor will have no effect in the system.

As port 246 is connected to the pressure source there will be rapid application of fluid under high pressure to effect rapid movement of valve member 219 to the right thereby rapidly connecting ports 246, 248 for quick applictaion of fluid under pressure to the motor 172 and correspondingly quick movement of the rudder effecting full swing of the rudder in a few seconds as contrasted with the relatively slow step by step movement of the rudder afforded with manual rotation of the steering wheel 182.

In order to effect movement of the rudder in the reverse direction, it is first necessary to move the handle 268 to neutral position to de-energize the solenoid 241. As a result, th e spring 245 reacting against ball 243 will move said ball onto its seat 235 and move ball 242 off its seat 234. When ball 243 moves against seat 235, further application of fluid under pressure to bore 215 and port 201 will stop. Since ball 242 is off its seat 234 the line 265 from port 201 and the bore 215 will both bleed through passageway 252 in valve 212 and port 247 to the reservoir 258 so that compressed spring 197 of disconnecting valve 185 will restore the valve member 194 thereof to the neutral position shown and the compressed coil spring 226 of valve 212 will restore the valve member 219 thereof also to neutral position shown.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A hydraulic control system for effecting rotary movement of a shaft on each side of a neutral position, comprising hydraulic actuating means operatively connected to said shaft to rotate the latter, said actuating means having control ports, a valve assembly having fluid pressure inlet and return ports, a source of fluid under pressure connected to the pressure ports of said valve assembly, a reservoir connected to said return ports, said valve assembly having movable valve means, resilient means reacting against said valve means normally retaining the latter in neutral position to block flow of fluid to said actuating means, a manually operable fluid pressure source operably connected to said valve assembly to effect movement of the valve means thereof to connect said source of fluid under pressure to said hydraulic actuating means, an electrically operable control means operably connected to said valve assembly to effect such movement of the valve means, and means to short circuit said manually operable fluid pressure source when said electrically operable control means is actuated.

2. The combination set forth in claim 1 in which a second hydraulic actutaor, comprising a rotary hydraulic motor is connected to said shaft, said motor having a pair of control ports connected to said manually operable fluid pressure source and means are provided to short circuit said rotary motor when said electrically operable control means is actuated.

3. The combination set forth in claim 1 in which a disconnector valve is provided in the hydraulic circuit between said manually operable fluid pressure source and said valve assembly, said disconnector valve having ports connected to said manually operable fluid pressure source, said disconnector valve having a movable valve member normally positioned operably to connect said manually operable fluid pressure source to said valve assembly, and the means to short circuit said manually operable fluid pressure source when said electrically operable control means is actuated, is operatively connected to said disconnector valve to effect movement of said valve member.

4. The combination set forth in claim 3 in which an electric solenoid is operatively connected to the movable valve member of said disconnector valve to effect movement thereof.

5. The combination set forth in claim 3 in which an electric solenoid is operatively connected to said valve assembly to control the latter, said disconnector valve has fluid operating ports connecting to said valve assembly, valve means controlled by said solenoid to connect fluid pressure from said pressure source to said disconnector valve for actuation thereof when said solenoid is actuated, said electrically operable control means controlling said solenoid.

6. The combination set forth in claim 1 in which a second hydraulic actuator comprising a rotary motor is connected to said shaft, said motor having a pair of control ports connected to said manually operable fluid pressure source, a disconnector valve is provided in the hydraulic circuit between said manually operable fluid pressure source and said valve assembly, said disconnector valve having ports connected to said manually operable fluid pressure source, said disconnector valve having a movable valve member normally positioned operably to connect said manually operable fluid pressure source to said valve assembly and means to short circuit said manually operable fluid pressure source and said rotary motor when said electrically operable control means is actuated, said means being operatively connected to said disconnector valve to effect movement of said valve member 7. The combinaiton set forth in claim 1 in which said valve assembly comprises a pair of opposed identical valves, each having a movable valve member comprising the valve means, said valve members being mechanically connected, a disconnector valve and a hydraulic actuator are provided in the hydraulic circuit between said manually operable fluid pressure source and said valve assembly, said actuator having a piston slidable therein and a piston rod operatively connected to said mechanically connected valve members, said actuator having a pair of ports, said disconnector valve having ports connected to said actuator and to said manually operable fluid pressure source, said disconnector valve having a movable valve member normally positioned to connect said manually operable fluid pressure source to said actuator and the means to short circuit said manually operable fluid pressure source and said actuator when said electrically operable control means is actuated, is operably connected to said disconnector valve to effect movement of said valve member.

8. The combination set forth in claim 7 in which a second hydraulic actuator comprising a rotary motor is connected to said shaft, said motor having a pair of control ports connected to said manually operable fluid pressure source, said rotary motor being short circuited when said valve member of said disconnector valve is moved.

9. The combination set forth in claim 7 in which a lever is provided operatively connected to said mechanically connected valve members of said valve assembly, said piston rod of said actuator is connected to said lever to pivot the latter, and a rack is also connected to said lever, a motor having a pinion engaging said rack, whereby when said electrically operable control means is actuated, said motor will be driven to effect movement of said rack and said lever to actuate said valve assembly.

10. The combination set forth in claim 7 in which a second hydraulic actuator comprising a rotary motor is connected to said shaft, said motor having a pair of control ports connected to said manually operable fluid pressure source, said rotary motor being short circuited when said electrically operable control means is actuated, a third hydraulic actuator is connected to said shaft, said pair of identical valves controlling said first and third hydraulic actuator respectively, to effect simultaneous application of fluid under pressure from said pressure source for application of torque in the same direction to said shaft.

11. The combination set forth in claim 7 in which a lever is provided operatively connected to said mechanically connected valve members of said valve assembly, said piston rod of said actuator is connected to said lever to pivot the latter, and a rack is also connected to said lever, a motor having a pinion engaging said rack, whereby when said electrically operable control means is actuated, said motor will be driven to effect movement of said rack and said lever to actuate said valve assembly, a second hydraulic actuator comprising a rotary motor is connected to said shaft, said motor having a pair of control ports connected to said manually operable fluid pressure source, said rotary motor being short circuited when said electrically operable control means is actuated, a third hydraulic actuator is connected to said shaft, said pair of identical valves controlling said first and third hydraulic actuator respectively, to effect simultaneous application of fluid under pressure from said pressure source for application of torque in the same direction to said shaft, said pressure source having a low pressure station, a medium pressure station and a high pressure station, valve means normally cutting off flow from said medium and high pressure stations, and means upon movement of said lever a predetermined amount to actuate said valve means to connect said pressure sources to the respective valve member of said valve assembly.

12. The combination set forth in claim 11 in which said shaft has a bar connected at one end thereto and said third actuator comprises a cylinder pivoted at one end and having a movable piston rod connected to the other end of said bar.

13. A hydraulic control system for effecting rotary movement of a shaft on each side of a neutral position, comprising hydraulic actuating means operatively connected to said shaft to rotate the latter, said actuating means comprising a member having four spaced reaction points in a plane at right angles to the axis of the shaft, a plurality of hydraulic actuators each having a casing pivoted to a fixed support and a slidable piston rod connected to an associated reaction point, lines drawn from the pivot of each actuator to the axis of said shaft being spaced substantially 90 degrees from each other when the shaft is in neutral position and lines drawn from the pivot of each actuator to the associated reaction point being at an angle to the associated first named line, each of said actuators having control ports, a valve assembly having fluid pressure inlet and return ports, means connecting said control ports to said valve assembly for energization of said actuators, a source of fluid under pressure connected to the pressure ports of said valve assembly, a reservoir connected to said return ports, said valve assembly having movable valve means, resilient means reacting against said valve means normally retaining the latter in neutral position to block flow of fluid to said actuating means, a manually operable fluid pressure source operably connected to said valve assembly to effect movement of the valve means thereof to connect said source of fluid under pressure to said hydraulic actuating means, and an electrically operable control means operably connected to said valve assembly to effect such movement of the valve means.

14. The combination set forth in claim 13 in which a pair of actuators are positioned on each side of the neutral position, each of said actuators having ports, lines connecting said ports to said valve assembly for energization of said actuators, a valve associated with each of said actuators to control the direction of movement of the piston rod thereof, and means controlled by the pivotal movement of the actuators to reverse the direction of movement of the piston rod of one of the actuators of each of the pairs when the actuators have pivoted so that the line drawn from the pivot thereof to the reaction point is aligned with the line drawn from the pivot to the axis of the shaft.

15. The combination set forth in claim 14 in which the piston rod of one of the actuators of each pair moves in the opposite direction to the piston rod of the other actuator of said pair, one of said piston rods pushing against its associated reaction point and the other pulling against its associated reaction point and the means reversing the direction of movement of the piston rod is operable with respect to the actuator whose piston rod is pulling against its reaction point.

References Cited by the Examiner

UNITED STATES PATENTS

| | | | |
|---|---|---|---|
| 1,773,794 | 8/1930 | Schneider | 60—52 X |
| 2,020,951 | 11/1935 | Lemond | 60—52 |
| 2,217,141 | 10/1940 | Sprenkle | 251—14 X |
| 2,512,979 | 6/1950 | Strother | 60—52 X |
| 2,741,478 | 4/1956 | Mercier | 91—453 X |
| 3,213,886 | 10/1965 | Pearne | 137—625.64 X |

EDGAR W. GEOGHEGAN, *Primary Examiner.*

ROBERT R. BUNEVICH, *Examiner.*